July 30, 1957      M. CHEVILLON      2,800,733
LIGHT BOX
Filed March 15, 1955      3 Sheets-Sheet 1
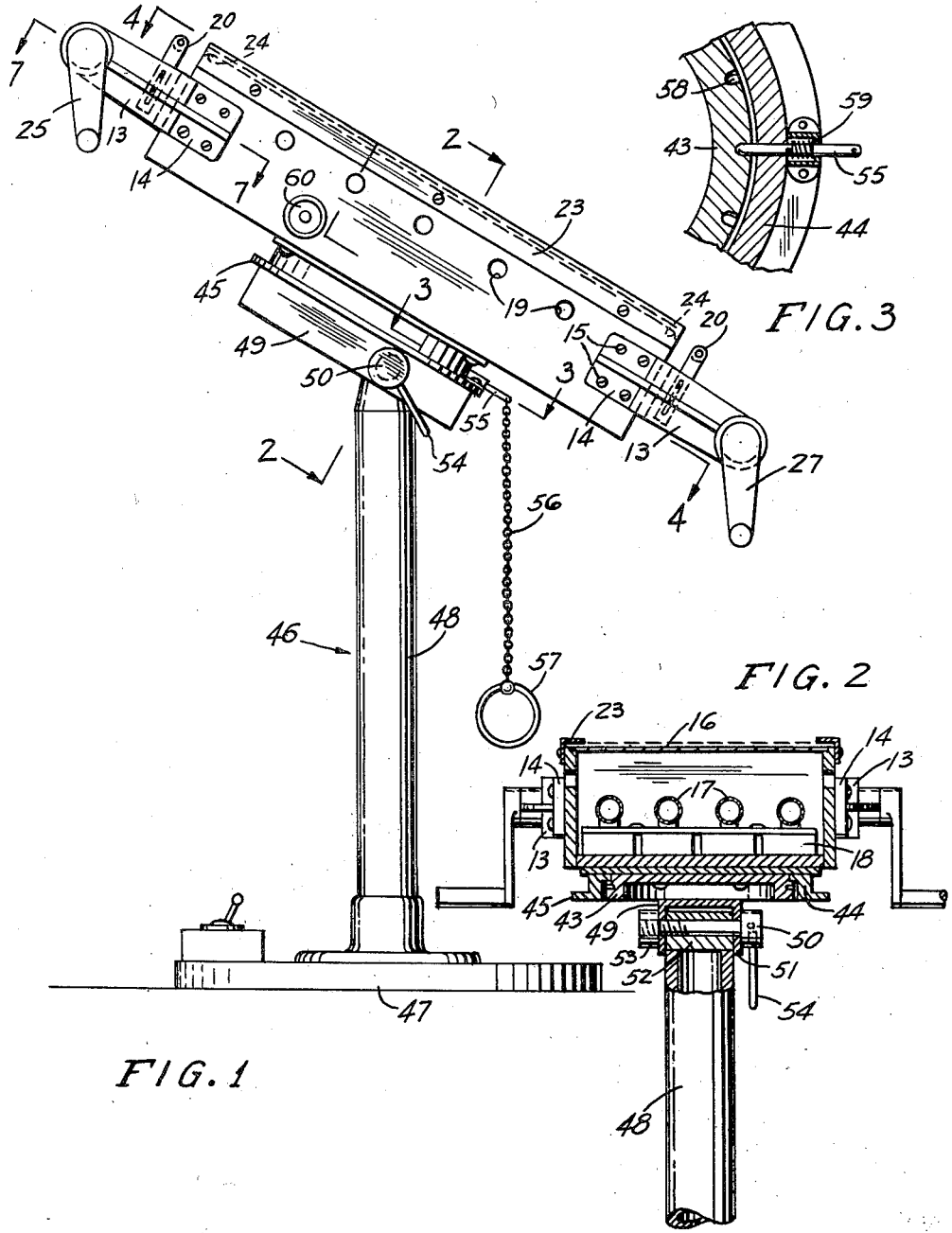
INVENTOR.
MANUEL CHEVILLON
BY
Walter S. Paul
ATTORNEY

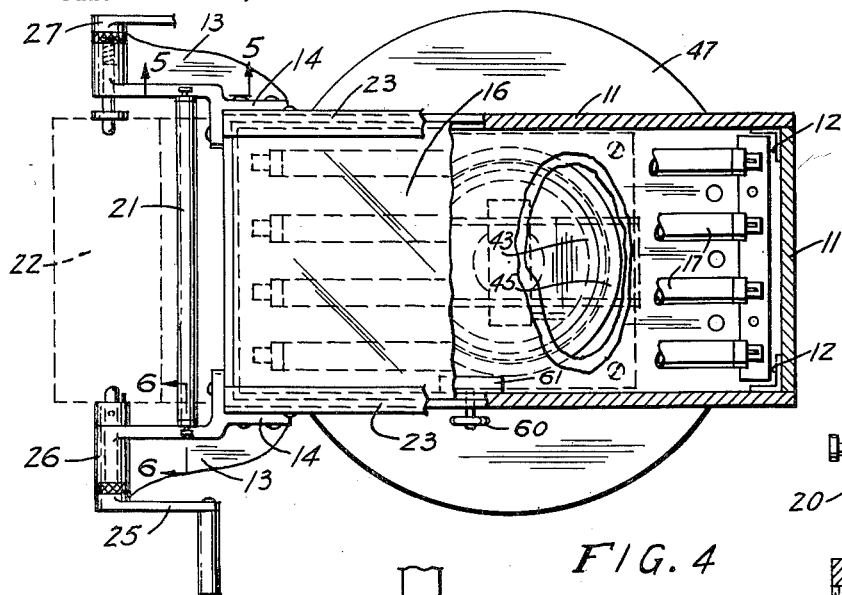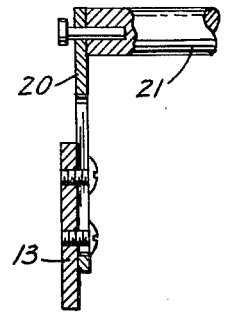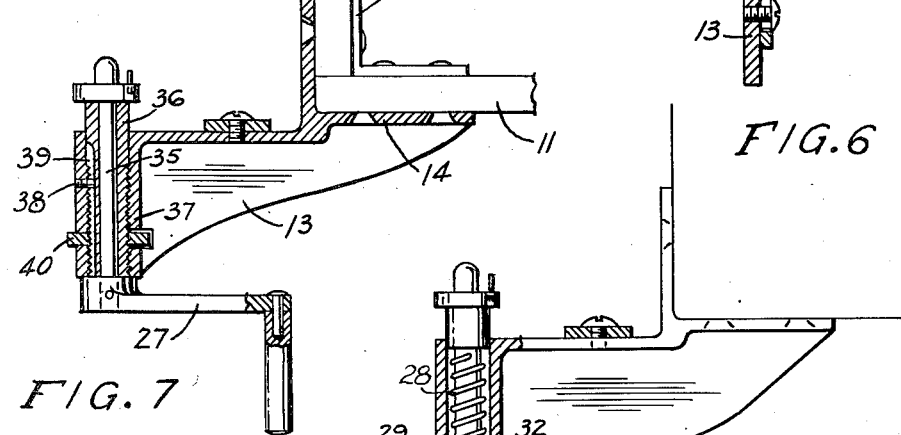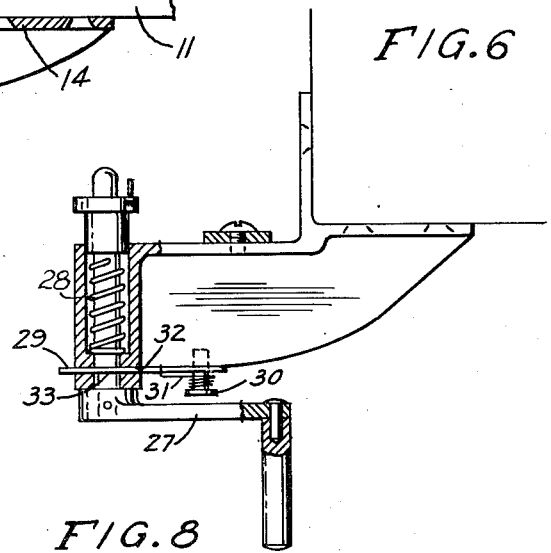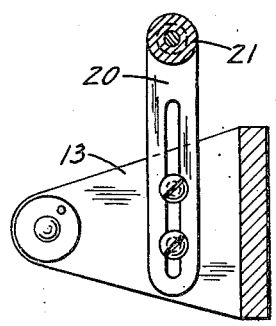

July 30, 1957 M. CHEVILLON 2,800,733
LIGHT BOX

Filed March 15, 1955 3 Sheets-Sheet 3

INVENTOR.
MANUEL CHEVILLON
BY
Walter S. Paul.
ATTORNEY

United States Patent Office 2,800,733
Patented July 30, 1957

2,800,733

LIGHT BOX

Manuel Chevillon, Arlington, Va., assignor to Photogrammetry, Inc., Silver Spring, Md., a corporation of Delaware Application March 15, 1955, Serial No. 494,455

6 Claims. (Cl. 40—31)

This invention relates to light boxes generally for inspection of film strips, but is more particularly adapted as an aid in photogrammetry work, for viewing of aerial photographic films and the like.

The object of this invention is to provide a convenient means for handling a roll of film selective portions of which it is desired to study or examine and interpret.

A further object is to provide a light box mounted for rotary horizontal adjustment for conveniently changing the angular direction of presentation of the view on the film with respect to the observer or operator, as he may desire.

A further object is to provide this light box with film roller turning cranks at each corner of the box so that the film may be readily moved in either direction over the illuminated surface of the box by a crank easily reached at the near side of the box in any of its angularly adjusted positions.

A further object is to provide the above mentioned pedestal with a tiltable supporting head for said light box which may be locked in any angular tilt position of the light box which may be found most convenient under any particular circumstances.

A further object is to provide the light box with transparent guide strips for holding down the film against the illuminated surface of the box.

A further object is to extend the illuminated surface substantially to the edges of the box so as to provide good illumination of the film to its very edges.

A further object is to provide an arrangement of light tubes in the light box, which will provide equal distribution of light on the under surface of the light transmitting top of the box.

A further object is to provide the film roller support brackets on diagonally opposite corners of the light box with motor operated roller turning shafts, and a foot-controlled switch for selectively operating said motors to move the film one way or the other whenever desired.

Figure 9:
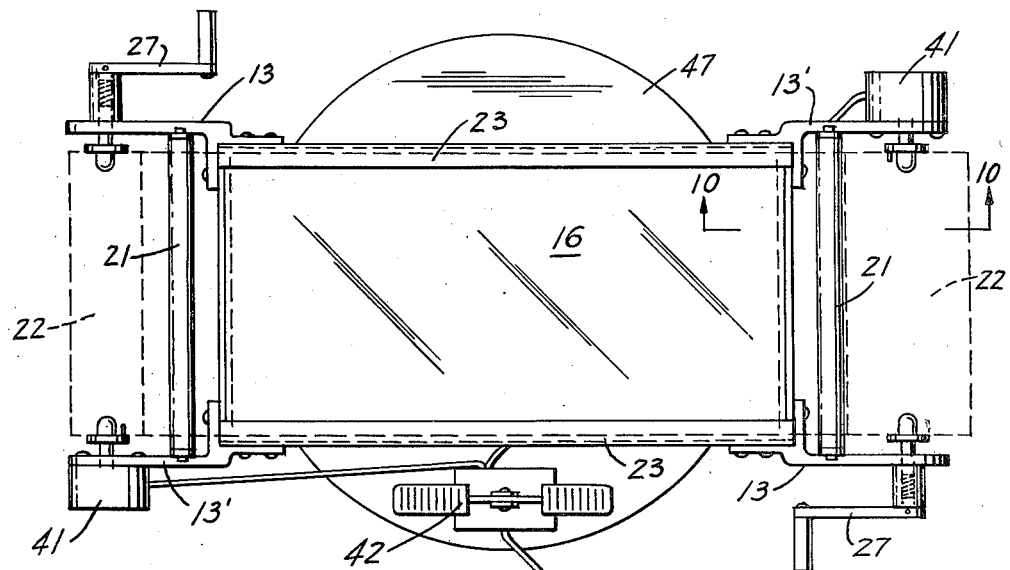
Figure 10:
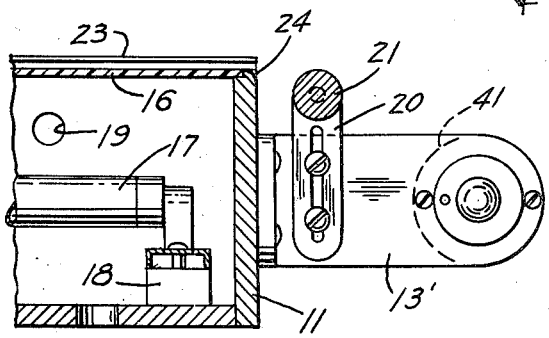

Other and more specific objects will appear in the following description of the details of the invention as illustrated in the accompanying drawings, wherein:

Fig. 1 is a side view of one form of the invention made for manual adjustment and operation, Figs. 2, 3 and 4 are sectional detail views taken on the correspondingly numbered section lines in Fig. 1, Figs. 5 and 6 are sectional detail views taken on lines 5—5 and 6—6 respectively in Fig. 4, Fig. 7 is a partial sectional view of one of the film spool holding castings taken on the line 7—7 in Fig. 1, Fig. 8 is a similar view showing an alternate form of retractable film spool holding spindle, Fig. 9 is a plan view of another form of light box, in which the film may be moved by electric motors operated by a selective foot-controlled switch, and Fig. 10 is a sectional detail view taken on the line 10—10 in Fig. 9.

The light box may be made of wood 11 reenforced on the inside corners with metal angle brackets 12. The bases 14 of the film spool castings 13 may serve also as metal angle brackets on the outside of the corners. Wood screws 15 may be used to fix these brackets in place.

The box is covered by a translucent sheet of white plastic material 16 set into the upper edges of the side walls, and is provided with four neon light tubes 17 extending the full length of the box and evenly distributed across the width thereof at a proper distance below the translucent sheet to give maximum evenly diffused lighting on said sheet when the tubes are lit up. The box is deep enough to provide space under these light tubes for the ballast boxes 18.

A series of holes 19 is distributed in the side walls to provide ventilation. The film spool castings 13 are fitted with vertically adjustable brackets 20 to support guide rollers 21 for the film as it is moved onto the lighted surface between the spools 22 at the ends of the box. These rollers relieve the pressure between the film and the translucent sheet and thus reduce friction to a minimum in moving the film by turning either spool. In its movement over this sheet the film is held down flat against it without restriction, however, by the transparent plastic angle bars 23 fixed to the side edges at the top of the box. Thus there is no obstruction to inspection of the film to its very outer edges, since the translucent sheet diffuses the light to its inset edges which extend substantially to the inner side of the hold-down angle bars. The top edges 24 of the box at the ends are rounded off to facilitate threading the film under the hold-down strips of the transparent angle bars 23, when the film is first mounted on the light box.

The castings 13 support crank arms for turning the film spools 22. The crank arms 25 at diagonally opposite corners of the box may be fixed axially in their bearings 26, while the other two crank arms 27 may each be spring pressed inwardly by spring 28 into spool engaging position and locked in this position by latch lever 29 pivoted at 30 to castings 13 and spring pressed by coil spring 31 into a slot 32 in the crank bearing into locking position over the shoulder 33 near the crank end of the crankshaft 34, as shown in Fig. 8. An alternative form of axial adjustment for this crank into and out of film spool engaging position is shown in Fig. 7. The shaft 35 in this case is mounted in a bearing sleeve 36 which is axially slidable in the casting bearing 37. The sleeve 36 is locked against turning by a lock pin 38 mounted in bearing 37 and extending into an axial groove 39 in sleeve 36. The outer end of sleeve 36 is externally threaded and provided with a knurled nut 40 fitted loosely in a slotted space through bearing 37. Thus when the nut is turned the sleeve 36 carrying the crank moves into or out of engaging position with the film spool, as may be desired.

Figs. 9 and 10 show a modification of the device in that the crank arms 25 are replaced by motors 41, thus relieving the operator from manual cranking operation to move the film. A foot switch 42 may be conveniently used for controlling the movement of the film, leaving the hands entirely free for other work at hand. The switch has three positions and is resiliently held in "off" position. When rocked forward or backward into one of the other two positions it turns on the selected motor 41 to move the film in one direction or the other, as may be desired. The motor cases may be designed to be cast integrally with castings 13' to simplify construction and assembly.

The light box has a large ring 43 firmly attached to the back of the box which is rotatably mounted in a circular shouldered bearing member 44, for free rotation therein. Bearing member 44 is provided with a flat support flange 45 for mounting on a wall in a convenient position off the work table of the operator, or for mounting on a pedestal 46 as shown in Figs. 1 and 2.

The pedestal has a heavy base 47 and post 48, to the top of which may be pivoted a channel 49, by means of lock bolt 50 passed through one flange 51 of the channel 49 and a bearing 52 fixed in the top of the post 48, and threaded into a nut 53 fixed on the other flange of the channel 49. The light box support flange 45 is mounted on the back of the channel 49, and thus the box may be tilted on the pedestal to any convenient angle and locked in this tilted position by tightening lock bolt 50, using the pin 54 for a better grip. It will be noted that the pivot is positioned off center with respect to the axis of the box sufficiently to bring it substantially directly below the center of gravity of the box when tilted to an average angular tilt most commonly used. Thus less effort is required in balancing the box when the bolt is loosened for readjusting the tilt angle.

For adjusting the box angularly about its vertical axis, considering the box in a horizontal position, the bearing member 44 has a locking pin 55 passing through its lowermost side with a pull chain 56 attached to it with a pull ring 57 at its end, for pulling the pin 55 out of the notches 58 in the periphery of ring 43 against the spring 59 which normally biases the pin against the periphery of ring 43 and into any V-notch that is brought in line with it. The box may thus be instantly turned to a convenient position and firmly locked therein by a very simple manipulation of pulling the chain 56, turning the box to the most convenient position desired at the particular moment, then releasing the pin and turning the box a little more if necessary to bring the nearest V-notch into locking relation with the pin. This operation is just as convenient whether the box is mounted on the pedestal or on the wall.

A potentiometer or rheostat 61 may be mounted inside the box and connected in the light tube circuit to adjust the intensity of the light when desired. The rheostat has a control knob 60 on a shaft extending through the wall of the box, for convenient operation. A cut-off switch may be suitably located on the base of the pedestal as shown in Fig. 1.

In connection with photogrammetric work it is necessary to inspect photographic films minutely and interpret the location, size, shape, direction etc., of permanent or movable objects appearing thereon with respect to a map or chart of the terrain over which the photographs were taken. The present invention has become indispensable to the interpreter in this work, and has enabled his work to be done more accurately and conveniently with resulting increased efficiency as well as accuracy.

While this light box is primarily adapted for photogrammetric work, its use is not intended to be limited thereto. It may be used in any other type of work requiring the detailed examination of selected portions of photographic or other film strips, especially where it is desirable to move the film or adjust the box with the least amount of manipulation, so as to free the operator's hands as much as possible for performing other simultaneous manual requirements of his job.

Furthermore, many obvious modifications in arrangement and detail construction of parts may be made without departing from the spirit and scope of this invention, as defined in the appended claims.

What is claimed is:

1. A light box comprising a rectangular enclosure having a translucent top, light means within said enclosure for providing substantially even distribution of light over the surface of said top, angle guide strips of transparent material on the sides of said top for holding down and guiding a film passed over said top, said translucent top extending substantially to the inner sides of said angle strips for transmitting light to the extreme edges of the film, angular castings externally reenforcing the vertical corners of the enclosure and having axially extending arms for supporting a film spool therebetween at each end of the enclosure.

2. A light box as defined in claim 1, a spindle in each arm for holding the spool, each spindle having means for turning its associated spool.

3. A light box as defined in claim 2, said means for turning comprising a crank handle on each spindle.

4. A light box as defined in claim 3, a ring member fixed to the back of said enclosure, a support flange having a ring member, said ring members having interlocking annular bearing shoulders to provide an axially restricted rotatable mounting for said enclosure on said support flange.

5. A light box as defined in claim 3, a support having a rotatable bearing means mounted on the back of said enclosure on an axis normal thereto, lock means for holding said enclosure in adjusted rotational position on said support, a pedestal having a vertically tiltable mounting for said support including a pivotal bearing at the top of said pedestal on an axis parallel to the plane of rotation of said enclosure on said support, a lock bolt passing through said bearing for locking said support at suitable angles of tilt, the point at which said bolt passes through said tiltable mounting being axially off center with respect to said support to bring it substantially under the center of gravity of said light box when tilted to an average angle of tilt required in the normal use of the light box, so as to reduce the effort to balance the light box during minor adjustments of the angle of tilt within said normal use range when the lock bolt is slackened.

6. A light box as defined in claim 2, said means for turning comprising a crank handle on each of two diagonally opposite spindles, motor means on the other two spindles, and switch means for selectively operating said motors in accordance with the direction it is desired to move the film.

References Cited in the file of this patent

UNITED STATES PATENTS

| | | |
|---|---|---|
| 700,264 | Trumbull | May 20, 1902 |
| 1,759,241 | Myers | May 20, 1930 |
| 2,607,144 | Harris | Aug. 19, 1952 |
| 2,652,657 | Joy | Sept. 22, 1953 |

FOREIGN PATENTS

| | | |
|---|---|---|
| 121,335 | Australia | Apr. 10, 1946 |
| 714,233 | France | Sept. 1, 1931 |